United States Patent
Held et al.

(10) Patent No.: US 10,706,281 B2
(45) Date of Patent: Jul. 7, 2020

(54) CONTROLLING FOCAL PARAMETERS OF A HEAD MOUNTED DISPLAY BASED ON ESTIMATED USER AGE

(71) Applicant: Microsoft Technology Licensing, LLC, Redmond, WA (US)

(72) Inventors: Robert Thomas Held, Seattle, WA (US); Richard Zachary Robinson, Woodinville, WA (US); Christopher Charles Aholt, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 103 days.

(21) Appl. No.: 16/101,316

(22) Filed: Aug. 10, 2018

(65) Prior Publication Data

US 2020/0050824 A1    Feb. 13, 2020

(51) Int. Cl.
G06K 9/46       (2006.01)
G06K 9/00       (2006.01)
G06N 20/00      (2019.01)
G02B 27/01      (2006.01)
G06F 3/01       (2006.01)

(52) U.S. Cl.
CPC ....... G06K 9/0061 (2013.01); G02B 27/0172 (2013.01); G06F 3/013 (2013.01); G06N 20/00 (2019.01)

(58) Field of Classification Search
CPC .. G02B 27/0172; G06F 3/013; G06K 9/0061; G06N 20/00
See application file for complete search history.

(56) References Cited

U.S. PATENT DOCUMENTS

| | | | | |
|---|---|---|---|---|
| 2012/0294478 A1* | 11/2012 | Publicover | ......... | G02B 27/0093 382/103 |
| 2016/0363770 A1* | 12/2016 | Kim | .................... | G02B 27/1066 |
| 2017/0160518 A1* | 6/2017 | Lanman | .................. | G06F 3/011 |
| 2018/0136486 A1* | 5/2018 | Macnamara | ......... | A61B 3/1015 |
| 2018/0225878 A1* | 8/2018 | Gromotka | ............ | G03H 1/2294 |

OTHER PUBLICATIONS

Google Scholar Search.*

(Continued)

*Primary Examiner* — Xin Jia (57) ABSTRACT

The disclosure herein describes controlling focal parameters of a head mounted display based on an estimated user age to account for increasing likelihood of presbyopia as user age increases. The head mounted display uses eye tracking sensors to collect ocular metric data associated with ocular features of a user's eye and a user age estimate is calculated based on analysis of the ocular metric data using a machine learning algorithm and an ocular metric data set. Further, a confidence value of the user age estimate is calculated based on the analysis of the ocular metric data. Then, focal parameters of the visual display of the head mounted display are controlled based on the user age estimate and confidence value. The described focal control method provides a seamless, automated way for a head mounted display system to adjust settings to provide a sharp, in-focus user experience for users of all ages.

20 Claims, 6 Drawing Sheets

(56) References Cited

OTHER PUBLICATIONS

Dowiasch, et al., "Effects of Aging on Eye Movements in the Real World", In Journal of Frontiers in human neuroscience, vol. 9, Article 46, Feb. 10, 2015, pp. 1-12.
Gislen, et al., "The accommodative pupil responses of children and young adults at low and intermediate levels of ambient illumination", In Journal of Vision Research, vol. 48, Issue 8, Mar. 2008, pp. 989-993.
Hoffman, et al., "Vergence-accommodation conflicts hinder visual performance and cause visual fatigue", In Journal of vision, vol. 8, No. 03, Mar. 1, 2008, pp. 1-30.
Peshori, et al., "Aging of the trigeminal blink system", In Journal of Experimental Brain Research, Nov. 2000, pp. 351-363.
Winn, et al., "Factors affecting light-adapted pupil size in normal human subjects", In Journal of Investigative Ophthalmology & Visual Science, vol. 35, No. 3, Mar. 1994, pp. 1132-1137.
Wyatt, Harry, "The Form of the Human Pupil", In Journal of Vision Research, vol. 35, Issue 14, Jul. 1995, pp. 2021-2036.
"International Search Report and Written Opinion Issued in PCT Application No. PCT/US2019/039646", dated Oct. 2, 2019, 11 Pages.

\* cited by examiner

CONTROLLING FOCAL PARAMETERS OF A HEAD MOUNTED DISPLAY BASED ON ESTIMATED USER AGE

BACKGROUND

Existing head-mounted displays (HMDs) use a single focal distance to display digital content. This constraint can make it uncomfortable for a user to look at holograms that are located near the user, but far away from the focal plane, due to a phenomenon known as vergence-accommodation conflict. Additionally, it may be virtually impossible to simultaneously focus on nearby holograms and nearby real-world objects. Variable-focus displays are in development that are able to adjust optical power to match where the user is looking, and multi-focal displays could render each holographic pixel at a different focal distance, enabling users to benefit from a more comfortable and realistic mixed-reality and/or virtual reality experiences.

However, by the age of 55, humans lose the ability to accommodate for nearby objects and must rely on bifocals or progressive lenses to view nearby objects clearly. This condition is known as presbyopia. It may be difficult for users with presbyopia to use and interact with mixed-reality or virtual reality experiences that include holograms that are rendered at nearby focal ranges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method and system for automatically controlling focal parameters of a head mounted display configured for providing virtual reality or augmented reality displays based on a machine-estimated user age is described. Ocular metric data associated with at least one ocular feature of a user's eye is collected using eye tracking sensors of the head mounted display. A user age estimate is then calculated based on an analysis of the ocular metric data using a machine learning algorithm and an associated ocular metric data set. Further, a confidence value of the user age estimate is calculated based on the analysis of the ocular metric data. Upon the user age estimate and confidence value being calculated, focal parameters of the visual display are controlled based on the estimate and confidence value.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Aspects of the disclosure provide a system and method for controlling focal parameters of a head mounted display configured for providing virtual reality or augmented reality displays based on an estimated user age. Ocular metric data associated with a user's eyes are collected using eye tracking sensors of the head mounted display. A user age estimate is then calculated based on the ocular metric data using a machine learning algorithm and an associated ocular metric data set. Further, a confidence value of the user age estimate is calculated based on the analysis of the ocular metric data. Upon the user age estimate and confidence value being calculated, focal parameters of the visual display are controlled based on the estimate and confidence value.

The described methods and systems provide an automated, streamlined way for a virtual or augmented reality system to determine whether a user is likely to have presbyopia and to change ocular parameters to enhance the user's experience based on the determination. For instance, when a user is likely to have presbyopia, the ocular parameters may be changed to prevent rendering visual output with a short focal range that the user may not be able to see clearly. The system makes use of machine learning techniques to enable accurate user age estimation based on the collected ocular metric data. Further, the machine learning algorithm(s) used may be tuned to further increase the accuracy of the estimation based on newly collected feedback data during operation. The described systems operate in an unconventional way to make use of the multiple types of ocular metric data that is already available for collection with using existing head mounted display technology to determine an accurate estimate of a user's age and, thereby, automatically control focal parameters based on the user's presbyopia or lack thereof, providing a positive user experience to users of all ages.

Figure 1:
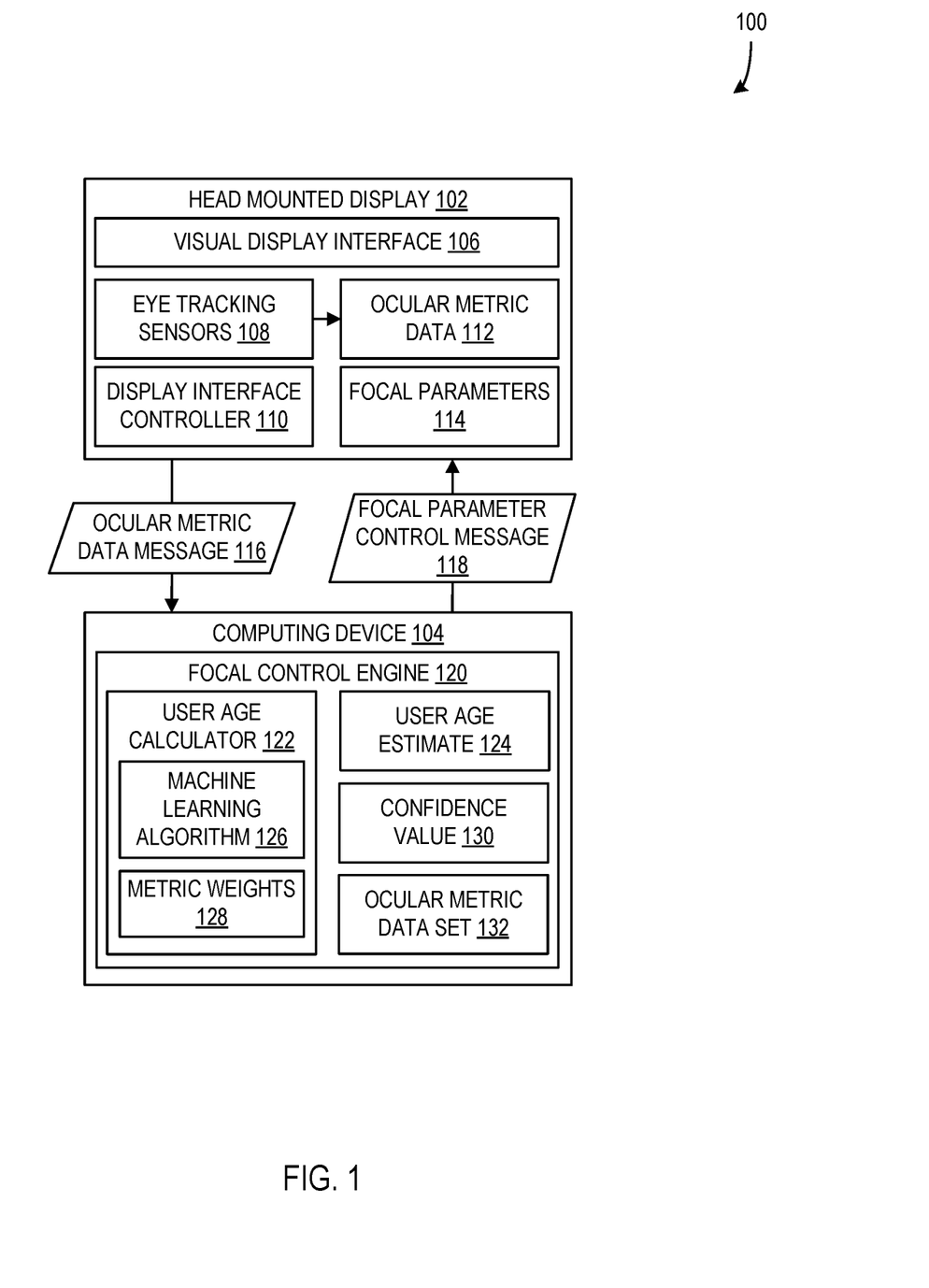
FIG. 1 is an exemplary block diagram illustrating a system configured for estimating a user's age based on collected ocular metric data and controlling focal parameters of a head mounted display based on the estimated age according to an embodiment.

FIG. 1 is an exemplary block diagram illustrating a system 100 configured for estimating a user's age based on collected ocular metric data 112 and controlling focal parameters 114 of a head mounted display 102 based on the estimated age according to an embodiment. The system 100 includes the head mounting display 102 (HMD) and an associated computing device 104. The HMD 102 includes a visual display interface 106, eye tracking sensors 108 that are configured to collect ocular metric data 112, and a display interface controller 110 that is configured to control the output to the visual display interface 106 based at least in part on focal parameters 114.

In some examples, the visual display interface 106 of the HMD 102 includes hardware, firmware, and/or software components configured to for displaying images, video, interfaces, and/or other visual output to a user of the HMD 102. For instance, the HMD 102 may be a virtual reality visor device with a visual display interface 106 including display screens arranged to be in front of a user's eyes. Alternatively, the HMD 102 may be augmented reality glasses with a visual display interface 106 including projection components or other display components configured to project or otherwise display visual output onto lenses of the glasses in front of a user's eyes. It should be understood that the visual display interface 106 may include any visual display components that are configured to provide a virtual reality experience, augmented reality experience, or the like to a user as would be understood by a person of ordinary skill in the art without departing from the description herein.

The eye tracking sensors 108 are components configured to sense various features of a user's eyes, eye lids, eye area, etc. while the HMD 102 is being used. The sensors 108 may include, for instance, one or more cameras or other optical capture devices that capture ocular metric data 112 associated with the user's eyes, such as pupil size data (e.g., static size value(s), etc.), pupil accommodation data (e.g., dynamic values associated with the magnitude and/or rate of change of the user's pupil size in response to varying illumination, etc.), pupil shape data (e.g., values associated with a degree to which the user's pupil matches a circular shape, etc.), blink dynamic data (e.g., dynamic values associated with duration of the user's blink and/or blink reflex latency, etc.), saccade dynamic data (e.g., dynamic values associated with rapid, fixational eye movements, such as saccade frequency, amplitude, peak velocity, and mean velocity, etc.), eye lid characteristic data (e.g., data values associated with visible wrinkles, uneven skin tone, and/or drooping eye lids, etc.), and/or progressive lens data (e.g., values associated with the presence of bifocals or other progressive lenses, etc.). The eye tracking sensors 108 may be configured to collect the ocular metric data 112 upon initial use of the HMD 102, at regular intervals throughout use of the HMD 102, and/or upon the occurrence of defined events during use of the HMD 102, etc. Ocular metric data 112 associated with the various ocular features described herein may be collected substantially simultaneously or at different defined times based on the configuration of the eye tracking sensors 108 and the HMD 102 generally. In some examples, the focal control engine 120 may be configured to request ocular metric data 112 from the HMD 102 and, in response, the HMD 102 may trigger the eye tracking sensors 108 to collect the ocular metric data 112.

The display interface controller 110 is a component of the HMD 102 that includes hardware, firmware, and/or software configured to control the visual output that is displayed on the visual display interface 106. In some examples, the display interface controller 110 includes a processor, microprocessor, or the like configured to interact with the visual display interface 106 based on the configuration of the focal parameters 114 (e.g., minimum focal distance, dynamic and/or static focal states, etc.). The focal parameters 114 may include configuration and/or settings values associated with visual settings of the visual display interface 106. The display interface controller 110 may be configured to translate focal parameters 114 into changes/adjustments of the hardware, firmware, and/or software of the visual display interface 106 that affect aspects of the displaying output. It should be understood that the focal parameters 114 may include any visual parameters or settings that a person of ordinary skill in the art would understand to affect focal aspects of the display of virtual reality or augmented reality visual output without departing from the description herein.

The computing device 104 may be a device integrated with the HMD 102 or a device associated with and/or in communication with the HMD 102 via a network interface connection. For instance, the computing device 104 may be a personal computer, laptop computer, tablet, smartphone, or other mobile device connected with the HMD 102.

The computing device 104 associated with the HMD 102 includes a focal control engine 120. The focal control engine 120 may include hardware, firmware, and/or software configured to receive ocular metric data, calculate an age estimate, and provide focal parameter control information or instructions based on the calculated age estimate as described herein. The focal control engine 120 includes a user age calculator 122 to calculate a user age estimate 124 based on an ocular metric data set 132. The user age calculator 122 is a software component that is configured to apply a machine learning algorithm 126 to the ocular metric data 112 received from the HMD 102. The machine learning algorithm 126 may be configured to use defined metric weights 128 associated with each ocular feature for which ocular metric data is being collected in calculating the user age estimate 124. Further, the machine learning algorithm 126 may be configured to develop, adjust, and/or improve a method of calculating the user age estimate 124 based on comparing the collected ocular metric data 112 to the ocular metric data set 132 and applying one or more machine learning techniques. It should be understood that the machine learning algorithm 126 may be configured as any machine learning algorithm as understood by a person of ordinary skill in the art that is configured to calculate a user age estimate without departing from the description herein.

In some examples, the machine learning algorithm 126 provides updates, changes, and/or adjustments to the metric weights 128 and how they are applied and/or age ranges identified based on the ocular metric data set 132 based on feedback from users and/or based on user behavior regarding the operation of the user age calculator 122. The feedback, metric weights 128, and other associated ocular metric data and/or age range data may be analyzed to identify ocular metric patterns that can be used by the user age calculator 122 and the machine learning algorithm 126 to estimate user age efficiently and accurately. Feedback provided to the user age calculator 122 and machine learning algorithm 126 may be used to adjust the metric weights 128. For instance, feedback may indicate that an ocular metric data associated with an ocular feature should affect the user age estimate calculation more substantially. As a result, the user age calculator 122 may be configured to adjust a metric weight 128 associated with the ocular feature to increase the weight applied to ocular metric data 112 associated with the ocular feature.

In some examples, the machine learning algorithm 126 comprises a trained regressor such as a random decision forest, directed acyclic graph, support vector machine, neural network, or other trained regressor. The trained regressor may be trained using the feedback data described above. Examples of trained regressors include a convolutional neural network and a random decision forest. It should further be understood that the machine learning algorithm 126, in some examples, may operate according machine learning principles and/or techniques known in the art without departing from the systems and/or methods described herein.

In an example, the machine learning algorithm 126 may make use of training data pairs (e.g., ocular metric data values and associated user age values, etc.) when applying machine learning techniques. Millions of training data pairs (or more) may be stored in a machine learning data structure (e.g., the ocular metric data set 132, etc.). In some examples, a training data pair includes a feedback data value paired with a metric weight adjustment value and/or an age range adjustment value. The pairing of the two values demonstrates a relationship between the feedback data value and the adjustment values that may be used by the machine learning algorithm 126 to determine future metric weight adjustments and/or age range adjustments according to machine learning techniques as would be understood by a person of ordinary skill in the art of machine learning.

The metric weights 128 may include values for each type of ocular metric data 112 based on the associated ocular feature that represent a degree to which the associated ocular metric data values affect the calculation of the user age estimate 124. For instance, metric weights 128 may be defined on a scale of 0 to 10 with lower values representing the associated ocular metric data values affecting the user age estimate calculating less than higher values (e.g., pupil accommodation data may be weighed an 8, indicating that it substantially affects the calculation, while pupil shape data may be weighed at 2, indicating that it only slightly affects the calculation, etc.).

The user age calculator 122 is configured to calculate the user age estimate 124, which may be in the form of a numeric age value. Alternatively, or additionally, the user age estimate 124 may include a plurality of age values and/or one or more age value ranges associated with defined focal control behavior (e.g., an age range associated with focal parameters being set to default values, an age range associated with focal parameters being set to limit the focal range of visual output, etc.). In some examples, the focal control engine 120, using the machine learning algorithm 126 or a related algorithm, may be configured to generate such age ranges based on analysis of the ocular metric data set 132 (e.g., an ocular metric data value of X is commonly found in users within the age range of greater than or equal to 40 years old, etc.).

In addition to calculating the user age estimate 124, the user age calculator 122 is configured to generate a confidence value 130 associated with the user age estimate 124. The confidence value 130 may be generated based on the operations of the machine learning algorithm 126. The confidence value 130 may indicate a degree to which the user age estimate 124 is accurate and it may be used in determining how to control the focal parameters 114. For instance, a high confidence value 130 may indicate that focal parameters 114 associated with the user age estimate 124 should be automatically implemented whereas a low confidence value 130 may indicate that focal parameters 114 associated with the user age estimate 124 should be suggested to the user but not automatically implemented.

The ocular metric data set 132 is configured to store ocular metric data from a plurality of users. The data of the data set 132 may be associated with the age of the associated user, such that the user age calculator 122 is enabled to identify an estimated age based on comparing the user's ocular metric data 112 with the data of the data set 132. The data set 132 may be stored in a database, data files, or other data structures as understood by a person of ordinary skill in the art. Further, while the data set 132 is shown as being integrated with the computing device, in some examples, the ocular metric data set 132 may be stored on a different device (e.g., a cloud storage device, etc.) and accessed by the focal control engine 120 as necessary to perform the operations described herein.

The HMD 102 is configured to provide an ocular metric data message 116 to the computing device 104 for use by the focal control engine 120 and the focal control engine 120 is configured to send a focal parameter control message 118 to the HMD 102 for use by the display interface controller 110 in adjusting, maintaining, or otherwise controlling the focal parameters 114. In some examples, the focal parameter control message 118 includes instructions for adjusting, maintaining, or otherwise controlling specific parameters of the focal parameters 114 which are then implemented by the display interface controller 110. Alternatively, or additionally, the focal parameter control message 118 may include the user age estimate 124 and confidence value 130 and the display interface controller 110 may be configured to adjust, maintain, or otherwise control the focal parameters 114 based on the user age estimate 124 and/or the confidence value 130 as described herein.

In some examples, the HMD 102 and computing device 104 are separate devices that communicate via one or more network interface connections as would be understood by a person of ordinary skill in the art. However, in alternative examples, the HMD 102 may be configured to perform the operations of the computing device 104, such that the HMD 102 includes the focal control engine 120 in addition to the other components described herein. In such an example, all the operations described herein may be performed by the HMD 102. It should further be understood that, in other embodiments, the operations of the HMD 102 and computing device 104 may be performed in a different order and/or by different devices or components (e.g., operations of the computing device 104 may be distributed across multiple computing devices, data of the system 100 may be stored in cloud-based storage, etc.) without departing from the description herein.

Figure 2:
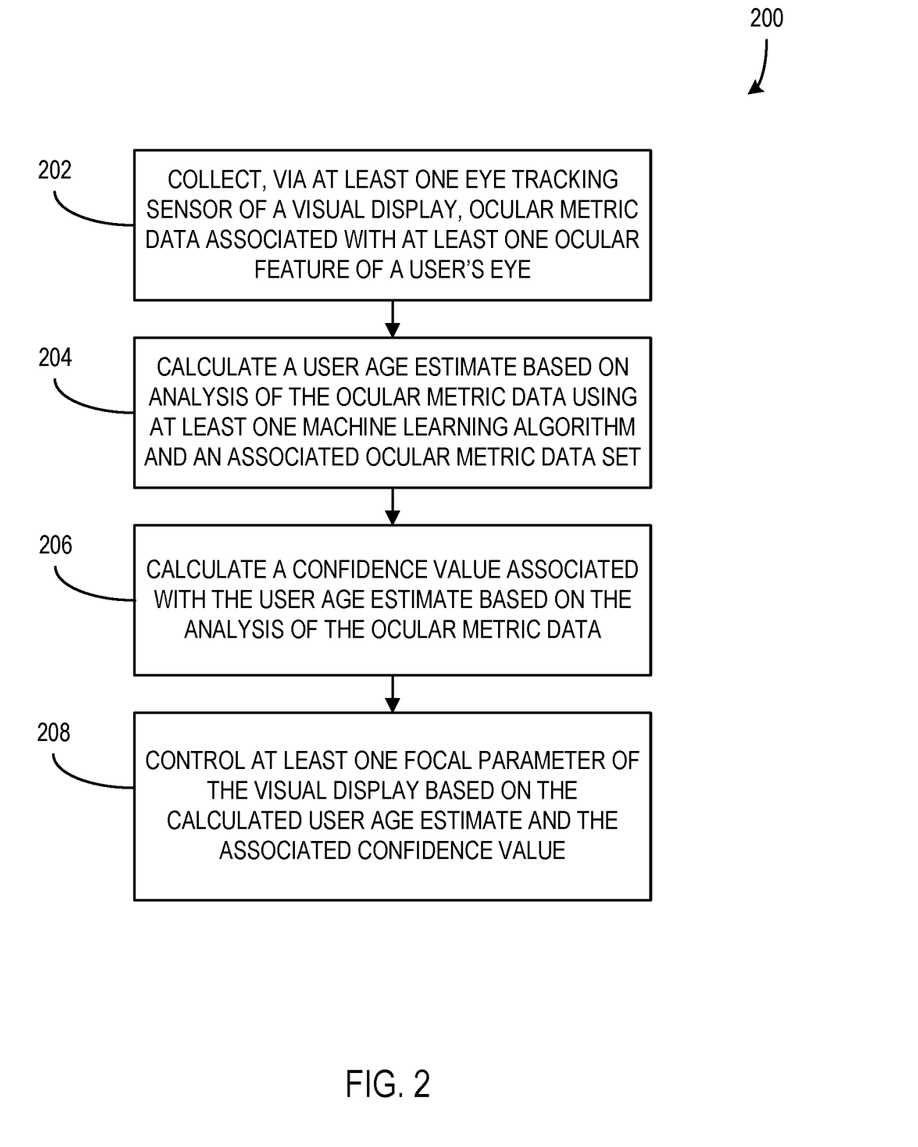
FIG. 2 is an exemplary flow chart illustrating a method of a controlling focal parameters of a head mounted display based on the estimated age according to an embodiment.

FIG. 2 is an exemplary flow chart 200 illustrating a method of a controlling focal parameters of a head mounted display based on the estimated age according to an embodiment. In some examples, the operations of flow chart 200 are performed by one or more components of a system, such as system 100 of FIG. 1, as described herein. At 202, ocular metric data associated with at least one ocular feature of a user's eye is collected via at least one eye tracking sensor of a visual display. The collection of the ocular metric data may be triggered based on a defined data collection schedule, an initial activation of the visual display or related components, and/or a request or other message received from an associated component (e.g., display interface controller 110, focal control engine 120, etc.). Collection may be performed by eye tracking sensors as described herein, including cameras or other optical sensors that are arranged to collect optical images and/or video of a user's eye(s) and/or areas surrounding the user's eye(s). For instance, an eye tracking camera of the visual display may record video data of a user's eyes upon the user initially activating the visual display.

In some examples, collection of the ocular metric data may be timed to coincide with the visual displaying defined image or video output to the user. For instance, the ocular metric data associated with pupil accommodation and/or other dynamic ocular features may be collected during the display of a pre-defined video that includes known visual cues, brightness changes, focus changes, or the like. Such a video may also be used when populating an ocular metric data set (e.g., ocular metric data set 132, etc.), such that the ocular metric data values to which the user's ocular metric data are compared are based on users viewing the same optical output.

As described above, the collected ocular metric data may include pupil size data, pupil accommodation data, pupil shape data, blink dynamic data, saccade dynamic data, eye lid characteristic data, progressive lens data, and/or ocular metric data associated with other eye features. Collecting such ocular metric data may include data processing operations in addition to the collection of the raw data values by the eye tracking sensors. For instance, collecting some ocular metric data values may require the analysis or processing of multiple sets of raw data (e.g., comparing pupil size values in multiple frames of video data in order to determine a degree to which the pupil dilates during a change in brightness in the video output, comparing a time difference between a frame capturing a minimum pupil size and a frame capturing a maximum pupil size to determine a reaction time of the users pupil to defined video output, etc.). Further, collecting ocular metric data values may include adjusting collected raw data values based on other aspects of the system (e.g., a pupil size value may be determined based on a diameter of the user's pupil captured in a frame or image by the eye tracking sensors combined with a known distance between the sensors and the user's eye, etc.). Additionally, or alternatively, collecting ocular metric data may include the eye tracking sensor and/or the associated controller of the HMD detecting eye biology in captured frames or images based on known eye biology patterns (e.g., detection of a pupil, iris, cornea, and/or eye lid in regions of a captured image based on previously defined eye biology patterns, etc.). Such detection may enable the collection of all optical metric data values associated with the detected eye biology part or portion.

At 204, a user age estimate (e.g., user age estimate 124, etc.) is calculated based on analysis of the ocular metric data using at least one machine learning algorithm (e.g., machine learning algorithm 126, etc.) and an associated ocular metric data set (e.g., ocular metric data set 132, etc.). In some examples, calculating the user age estimate includes analyzing ocular metric data for each measured eye feature by comparing the collected data values to data values and/or data value patterns associated with the eye features in the ocular metric data set. In this way, the machine learning algorithm may determine an age value or age value range with which the collected ocular metric data values are likely to correspond. The algorithm may determine likely age values or age value ranges for the collected data associated with each eye feature and then combine the determined values or value ranges to generate the user age estimate. The calculation may further include application of metric weights to prior to the combination of values or value ranges. Further exemplary details of calculating the user age estimate are describe below with respect to FIG. 4.

At 206, a confidence value (e.g., confidence value 130, etc.) associated with the user age estimate (e.g., user age estimate 124, etc.) is calculated based on the analysis of the ocular metric data (e.g., ocular metric 112, etc.). Calculation of the confidence value may include determining a likelihood that the user age estimate is correct based on a degree or degrees to which the collected ocular metric data values fit into known age values or age value ranges of the ocular metric data set. For instance, if the user age estimate indicates that the user is 55 years old or older and all of the collected ocular metric data values indicate that the user is greater than 55 years old, the calculated confidence value of the user age estimate is likely to be high. Alternatively, if the user age estimate indicates that the user is between 25 and 30 years old and only half of the collected ocular metric data values indicate that the user is within that age range, the calculated confidence value is likely to be lower than in the previous example. The calculation of the confidence value is also described in greater detail below with respect to FIG. 4.

At 208, at least one focal parameter (e.g., focal parameters 114, etc.) of the visual display is controlled based on the calculated user age estimate and the associated confidence value. In some examples, current focal parameters are maintained at the same values and/or adjusted to other values. For instance, if the user age estimate and confidence value indicate that the focal parameters should be set to the values at which they are currently set, the focal parameters are maintained, while, if the user age estimate and confidence value indicate that the focal parameters should be set to different values that the values at which they are currently set, the focal parameters are adjusted based on the user age estimate and the confidence value. Controlling at least one focal parameter may include maintaining all of the focal parameters at their current settings, maintaining a first subset of focal parameters and adjusting a second subset of focal parameters, or adjusting all of the focal parameters to other settings. As described above, focal parameters may include a minimum focal distance value and/or other focal parameters as would be understood by a person of ordinary skill in the art. The operations for controlling the focal parameters of the system are described in greater detail below with respect to FIG. 3.

Figure 3:
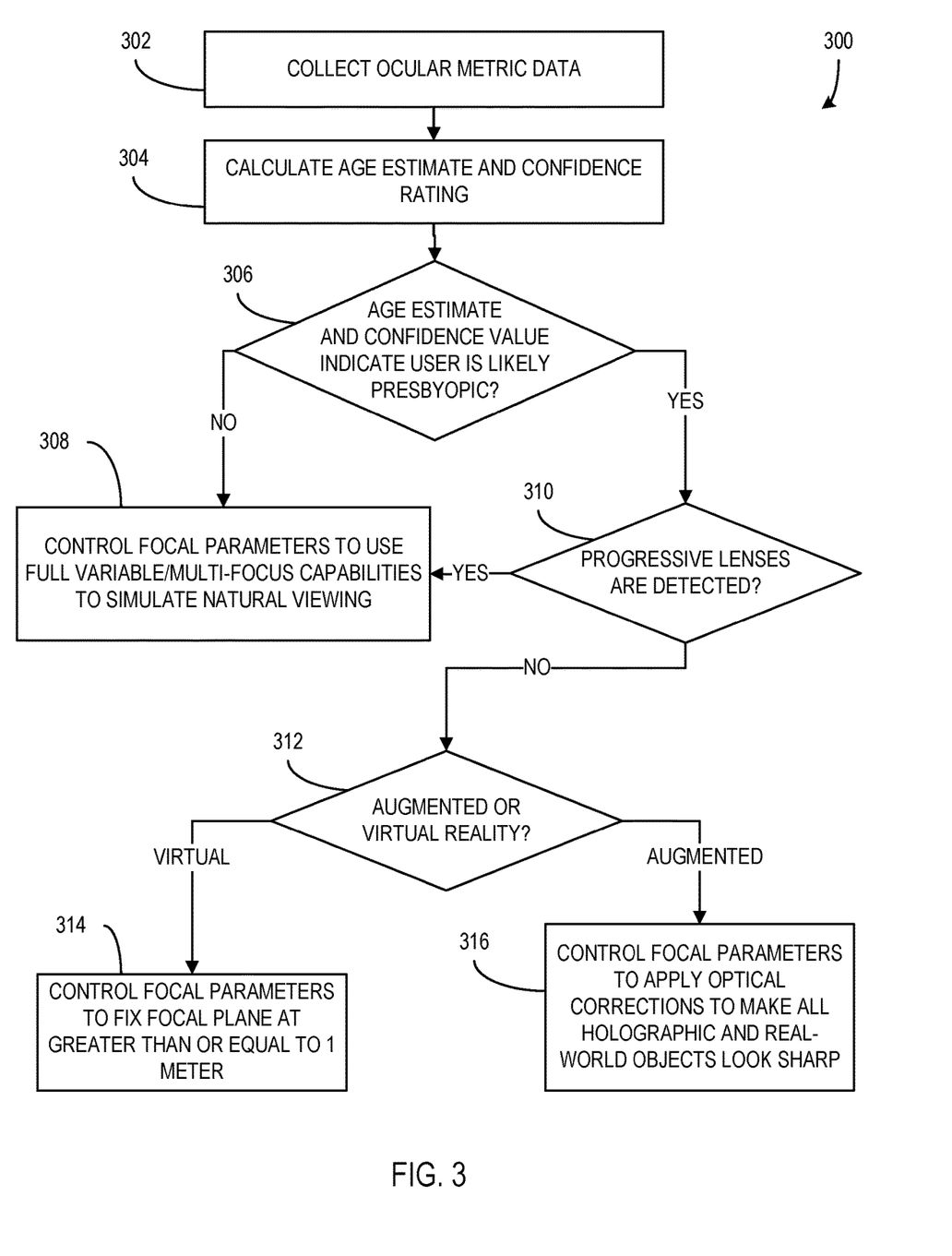
FIG. 3 is an exemplary flow chart illustrating a method of determining how to control focal parameters of a head mounted display based on an estimated age and associated factors according to an embodiment.

FIG. 3 is an exemplary flow chart 300 illustrating a method of determining how to control focal parameters of a head mounted display based on an estimated age and associated factors according to an embodiment. In some examples, the operations described by flow chart 300 may be performed by one or more components of a system, such as system 100 of FIG. 1. At 302-304, the ocular metric data is collected and a user age estimate and confidence value are calculated based on the collected ocular metric data. The operations of 302 and 304 may be substantially the same as those described above at 202-204 of FIG. 2 and/or the operations of FIG. 4 described below. Upon an age estimate and confidence value being calculated, it is determined whether the age estimate and confidence value indicate that the user is likely to be presbyopic.

It is known that users over the age of 55 are extremely likely to be presbyopic, and users in the age range of 40-55 become progressively more likely to be presbyopic as they age. Age estimates that fall in the ranges of "above 55 years old" and/or "between 40 and 55 years old" may be used to determine the likelihood that the user is presbyopic based on the calculated age estimate. For instance, when the age estimate indicates that the user is over 55 years old, the system determines that the user is likely presbyopic. Alternatively, when the age estimate indicates that the user is younger than 40, the system may determine that user is likely not presbyopic. More and/or different age ranges may be used when determining the likelihood that the user is presbyopic.

In some examples, the details of how the focal parameters are controlled may be based on the age estimate and the confidence value. For instance, an age range may be defined that includes ages where users may or may not be presbyopic (e.g., between 40 and 55 years old, etc.). If the age estimate of the user falls in this age range, rather than the system automatically controlling or adjusting focal parameters, the user may be prompted with focal parameter control suggestions that the user can confirm or deny. The suggestions may be in the form of text or a dialog box that explains the changes that will be made if confirmed. Alternatively, or additionally, the system may provide the user with example visual output of the current focal parameter settings and the adjusted focal parameter settings, enabling the user to choose the focal parameter settings that provide the preferred visual experience.

Further, the confidence value may affect the method in which the focal parameters are controlled. One or more confidence thresholds may be defined that represent different focal control behavior at 308, 314, and 316 as described herein. In some examples, above a defined threshold indicating that the age estimate is very likely accurate (e.g., a confidence value of 80% or above, etc.), the focal parameter control and/or adjustments indicated by the age estimate may be performed automatically. If the confidence value is below the defined threshold, the focal parameter control and/or adjustments may be provided to the user in the form of suggestions as described above, enabling the user to select whether to implement them or not. In this way, when the system does not identify a user age with high confidence and is therefore more likely to inaccurately change focal parameters, the user is enabled to provide confirmation that changes or other focal parameter controls are correct prior to implementation.

If, at 306, it is determined that the user is likely not presbyopic, at 308, the focal parameters are controlled to use full variable/multi-focus capabilities to simulate natural viewing. These focal parameters may be configured as the default parameters, as the system may assume that the user's eyes are capable of fully accommodating most or all possible focal ranges and other aspects of simulating "natural" viewing using virtual reality display output. Such settings may enable a full range of focal distances, from directly in front of the user's eyes to the optical infinity in a virtual reality landscape.

Alternatively, if, at 306, the age estimate and confidence value indicate that the user is likely presbyopic, then it is determined whether progressive lenses, bifocals, or the like are detected at 310. If progressive lenses or bifocals are detected, the process proceeds to 308 to control the focal parameters for use of full variable/multi-focus capabilities as described above. Alternatively, if progressive lenses or bifocals are not detected at 310, the process proceeds to 312 as described below. Detecting progressive lenses or bifocals may be performed during collection of the ocular metric data, as the eye tracking sensors may be configured to detect the presence of such lenses using pattern recognition and/or detecting artifacts in the captured images or frames of the user's eyes that indicate the presence of such lenses. Alternatively, or additionally, the system may prompt the user to indicate whether they are using progressive lenses/bifocals or not.

At 312, if the system is being used to provide virtual reality output to the display, the process proceeds to 314 and focal parameters are controlled to fix the focal plane of the visual output at greater than or equal to 1 meter. This settings adjustment reduces the flexibility of the system to display visuals that appear very close to the user, but it reduces the likelihood that the user experience of a presbyopic user is harmed by portions of the display appearing unreadable, out of focus, and/or blurry. In some examples, other adjustments of the parameters may also be made to further prevent the presbyopic user from being exposed to visual output that they cannot see, as would be understood by a person of ordinary skill in the art, without departing from the description herein.

Alternatively, at 312, if the system is being used to provide augmented reality output to the display/lenses of the HMD, the process proceeds to 316 and focal parameters are controlled to apply optical corrections to make all holographic and real-world objects look sharp to the presbyopic user. In some examples, the lenses and/or visual output provided thereon are adjusted by the system to mimic the functionality of progressive lenses or bifocals, providing the user with in-focus visuals regardless of the focal distance. For instance, when objects are brought close to the user's eyes, the system may detect it and adjust lenses to take on the properties of progressive lenses until the user returns to looking at objects further away. Adjustments made to the lenses and/or visual output may be made uniformly, such that the lens properties change based on the user's interactions with holographic objects and/or environments, rather than providing multiple regions of a lens with differing focal powers as with progressive lenses and bifocals.

Figure 4:
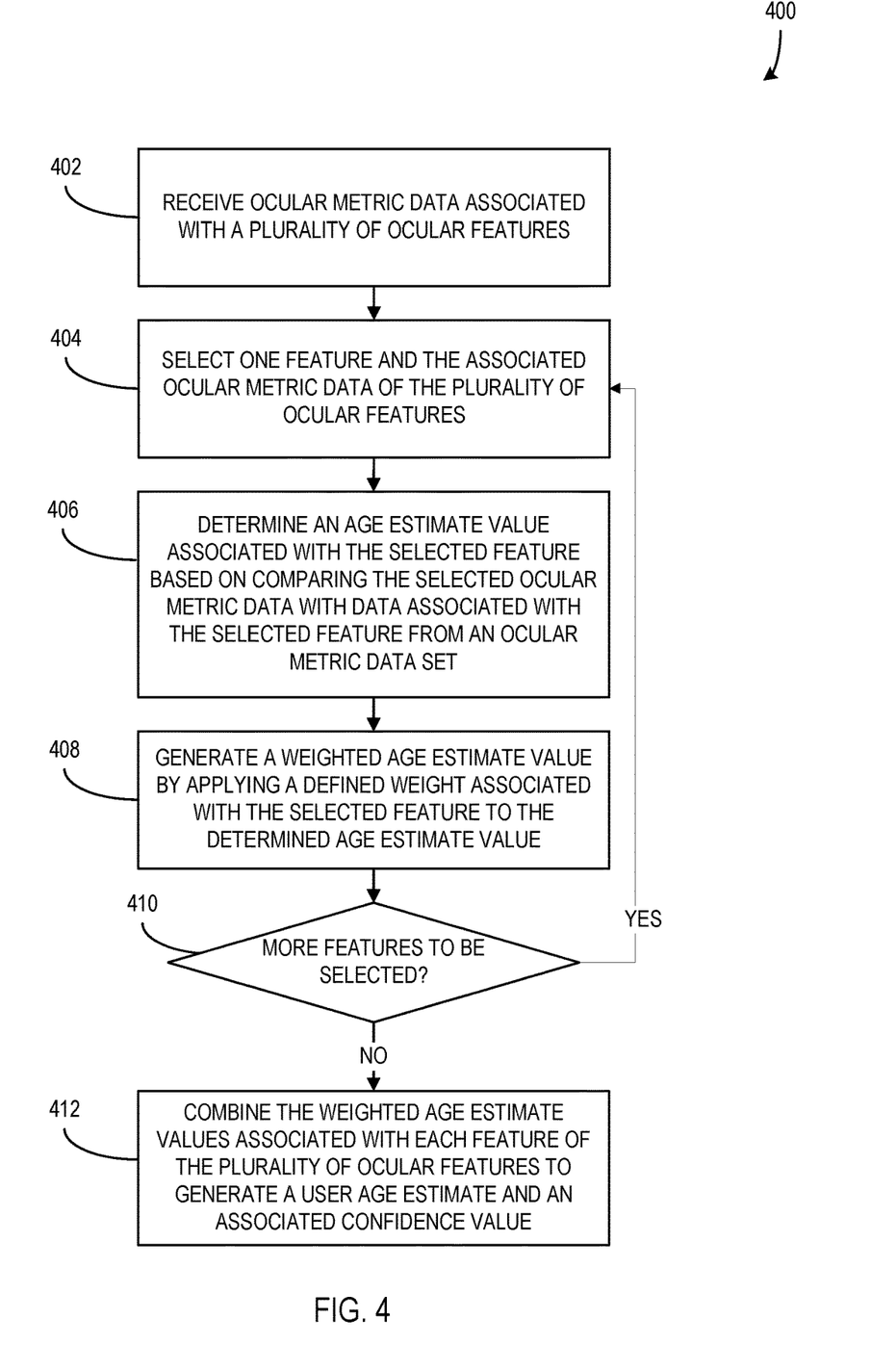
FIG. 4 is an exemplary flow chart illustrating a method of estimating a user's age based on ocular metric data associated with a plurality of ocular features according to an embodiment.

FIG. 4 is an exemplary flow chart 400 illustrating a method of estimating a user's age based on ocular metric data (e.g., ocular metric data 112, etc.) associated with a plurality of ocular features according to an embodiment. In some examples, the operations described by flow chart 400 may be performed by one or more components of a system, such as system 100 of FIG. 1. At 402, ocular metric data associated with a plurality of ocular features is received as described above. The plurality of ocular features may include pupil size, pupil accommodation, pupil shape, blink behavior, saccade behavior, eye lid characteristics, and/or other ocular or eye-related features that can be observed or tracked by an eye-tracking sensor of the HMD as described herein. The received ocular metric data may include data values associated with each of the plurality of ocular features, enabling the system to calculate a user age estimate based on all of the ocular features of the plurality of ocular features.

At 404, one ocular feature of the plurality of ocular features is selected and the selection includes the ocular metric data associated with the selected ocular feature. At 406, an age estimate value associated with the selected feature is determined based on comparing the selected ocular metric data of the ocular feature to corresponding data in the ocular metric data set (e.g., ocular metric data set 132, etc.) based on the current state of a machine learning algorithm (e.g., machine learning algorithm 126, etc.). For instance, the machine learning algorithm may be trained in such a way that the ocular metric data values of the selected ocular feature map to age values or age value ranges based on metric data value patterns of the ocular metric data set (e.g., a pupil size data value of X maps to an age range of 25-29, etc.).

At 408, a weighted age estimate value is generated by applying a defined weight associated with the selected feature to the determined age estimate value. Each ocular feature may have different levels of correspondence with age values or age ranges and the defined weight values specific to each ocular feature reflect these differing levels. For instance, pupil accommodation data values may be strongly indicative of a user's age, resulting in a relatively heavy weight value (e.g., 0.8 on a scale of 0.0 to 1.0, 8 on a scale of 1 to 10, etc.) being applied to pupil accommodation values, while pupil size values may only be slightly indicative of a user's age relative to pupil accommodation, resulting in a relatively light weight value (e.g., 0.2 on a scale of 0.0 to 1.0, 2 on a scale of 1 to 10, etc.) being applied to pupil sizes values.

At 410, if more features remain to be selected, the process returns to 404 to select another feature. Each feature may be selected in a defined order (e.g., based on collection order, heavy weight feature to light weight feature based on associated weight values, etc.) or randomly. Alternatively, if, at 410, there are no more features to be selected, the process proceeds to 412.

At 412, the weighted age estimate values of each ocular feature are combined to generate a user age estimate and an associated confidence value. The weighted age estimate values are combined such that the weights of each value represent a degree to which the final user age estimate is affected by the associated age estimate value. For instance, the more heavily weighted pupil accommodation-based age value mentioned above has a larger effect on the final user age estimate than the more lightly weighted pupil-size-based age value. In some examples, combining the weighted age estimate values includes summing or adding the weighted age estimate values together and then dividing by the total weight value (e.g., a sum of all the weights applied to the age estimate values, etc.) to arrive at a user age estimate. Alternatively, or additionally, other processing may be included in the calculation of the user age estimate without departing from the description herein.

A confidence value may be generated or calculated based on the degree to which age estimate values associated particular ocular features are similar or different. For instance, if the age estimate values for all of the ocular features of the received ocular metric data indicate the same age value or age value range, the resulting confidence value is likely to be relatively high (e.g., 95% confidence, etc.). Alternatively, if the age estimate values for all the ocular features indicate age values or age value ranges that are spread out, the resulting confidence value is likely to be lower (e.g., 50% confidence, etc.).

In some examples, the machine learning algorithm includes a decision tree that has been trained based on historical ocular metric data from the ocular metric data set. Such a decision tree may be traversed from node to node based on the received ocular metric data values associated with ocular features of the current user's eyes. Leaf nodes (e.g., nodes of the tree without child nodes, etc.) of the decision tree may include user age estimates, such that when a leaf node is arrived at during traversal, the associated user age estimate is used as the user age estimate for the current user. Such a tree traversal algorithm may be used in conjunction with or instead of other operations for calculating user age estimates as described herein.

Figure 5:
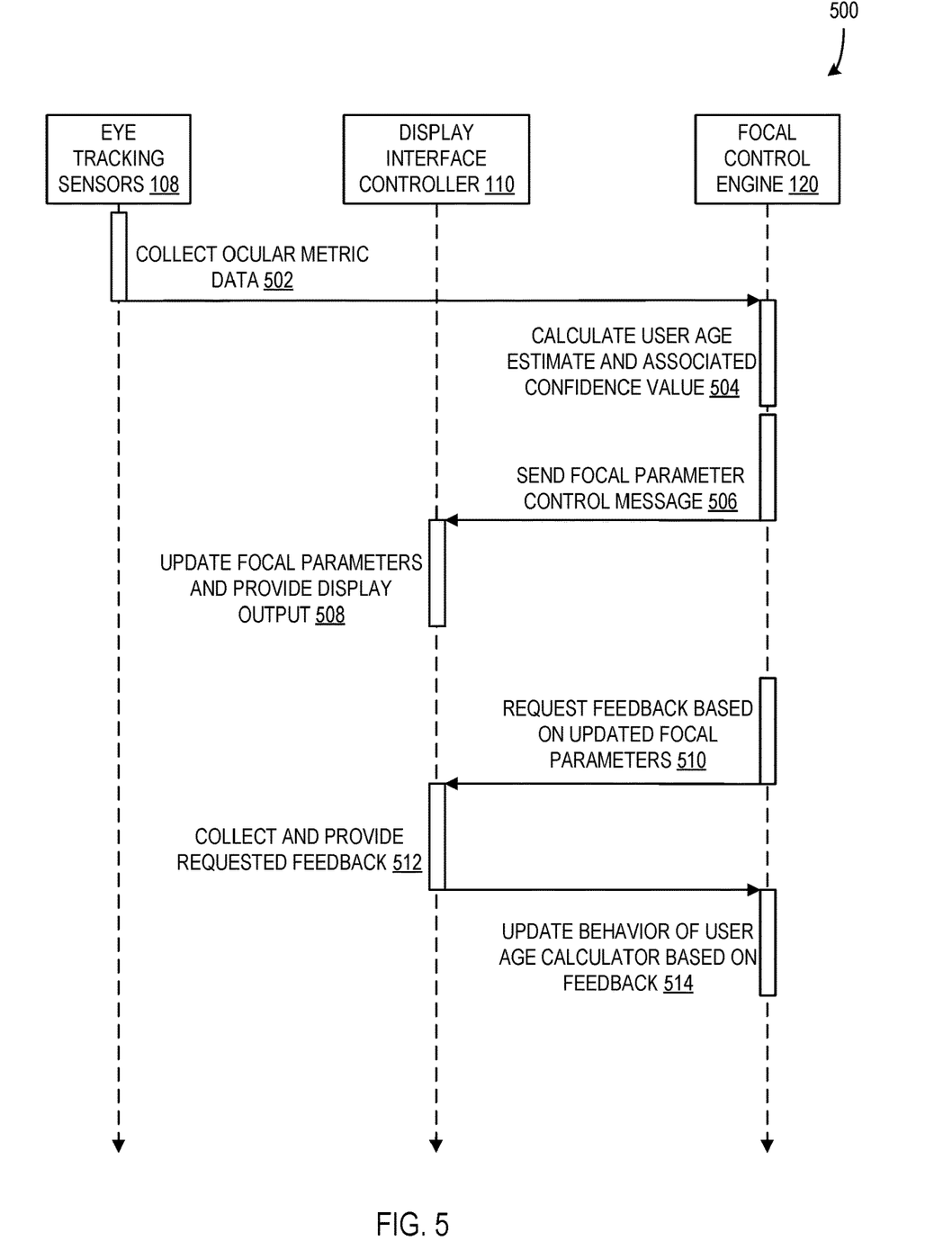
FIG. 5 is an exemplary sequence diagram illustrating the interaction between components of the system of FIG. 1 to control focal parameters, collect feedback based on the controlled focal parameters, and updating parameters of a user age calculator based on the collected feedback according to an embodiment.

FIG. 5 is an exemplary sequence diagram illustrating the interaction between components of the system of FIG. 1 to control focal parameters, collect feedback based on the controlled focal parameters, and updating parameters of a user age calculator based on the collected feedback according to an embodiment. At 502, ocular metric data is collected by the eye tracking sensors 108 and provided to the focal control engine 120. In some examples, the ocular metric data 502 may be stored within the HMD and/or sent to the focal control engine 120 via the display interface controller 110 or other associated controller, manager, or processor component of the HMD.

At 504, the user age estimate and associated confidence value are calculated as described above. The focal control engine 120 the sends a focal parameter control message 506 to the display interface controller 110 at 506. The focal parameter control message may include the calculated user age estimate and confidence value and/or instructions generated by the focal control engine 120 based on the calculated user age estimate and confidence value.

At 508, the display interface controller 110 updates focal parameters and provides an associated display output to the user of the HMD. In some examples, the updates of focal parameters may include maintaining focal parameter values and/or adjusting focal parameter values to accommodate the estimated vision capabilities of the user. The display output provided after the update of the focal parameters may be affected by those parameter updates as described herein.

At 510, the focal control engine 120 requests feedback based on the updated focal parameters. The feedback request may be automatically scheduled or otherwise triggered and it may include data indicating the type or types of feedback being requested, etc.

At 512, the display interface controller 110 receives the feedback request and proceeds to collect and provide the requested feedback back to the focal control engine 120. In some examples, the display interface controller 110 may collect the feedback by determining use of the HMD by the user after the focal parameters are updated. For instance, if the display interface controller 110 determines that the user has manually changed the settings away from the updated focal parameters, such a change may be treated as negative feedback, or feedback that indicates that the calculated user age estimate was incorrect, or perhaps the confidence value was too high. Alternatively, or additionally, collecting the feedback may include prompting the user to provide feedback, such as prompting the user to provide their age and/or prompting the user to indicate whether the display output appears blurry or out of focus.

At 514, the focal control engine 120 receives the provided feedback data and updates the behavior of the user age calculator based on the feedback. The updates to the user age calculator may include adjusting the metric weights 128 and/or training or tuning the machine learning algorithm 126 according to known machine learning techniques. Feedback that indicates the calculated user age estimate and/or confidence value is accurate may result in updates or adjustments to the user age calculator that maintain or reinforce the behavior that led to the correct result. Alternatively, feedback that indicates the calculated user age estimate and/or confidence value is inaccurate may result in updates or adjustments to the user age calculator that alter or refine the behavior to improve the accuracy of future user age estimates in response to similar combinations of ocular metric data.

Additional Example Scenarios

Aspects of the disclosure enable various additional scenarios, such as next described.

In an example, a user puts on a head mounted display (HMD) device linked to a nearby computing device. The user activates the HMD and an initial calibration video output is displayed to the user. During the calibration video output, eye tracking sensors gather ocular metric data of the user based on the user's eye activity while observing the video output. Upon completion of the calibration video output, the collected ocular metric data is sent to a focal control engine on the linked computing device. The focal control engine applies a machine learning algorithm to the collected ocular metric data to calculate a user age estimate and an associated confidence value. The focal control engine determines that it is likely that the user is less than 40 years old based on the ocular metric data. The focal control engine generates focal parameter instructions based on the user age estimate of younger than 40 years old and sends the instructions to a display interface controller of the HMD. The display interface controller updates the focal parameters of the HMD to the default focal parameters based on determining that the user is less than 40 years old, the default focal parameters cause the HMD to provide a full multi-focal experience to the user.

In another example, a user that is over 55 puts on the HMD from the above example and activates it. After the HMD collects the ocular metric data of the new user and sends it to the focal control engine, a user age estimate of "55 or older" is calculated with a high confidence value. The focal control engine communicates with the display interface controller as described herein to cause the focal parameters to be adjusted in response to the user age estimate. In particular, the visual output provided to the user will be limited to focal ranges greater than 1 meter from the user's eyes to account for the user having presbyopia due to their age.

In another example, a user that is 45 years old but does not yet suffer from presbyopia puts on an HMD in the form of augmented reality glasses. The HMD displays calibration visual output to the user and collects ocular metric data as described herein. The HMD connects, via a network connection, to a cloud-based focal control engine to transmit the collected ocular metric data. The focal control engine determines that the user is likely 40 to 50 years old with a medium confidence value. Due to uncertainty about the capabilities of the user's eyes based on the estimated age and confidence value, the focal control engine provides focal parameter control instructions instructing the display interface controller to provide suggested settings changes to the user, offering the user the option to maintain the current default settings or switch to settings that accommodate presbyopia based on whether the user uses bifocals/progressive lenses or not. The user selects to keep the default settings because the user does not wear bifocals. The user's selection is then provided to the cloud-based focal control engine and used as feedback to further train the user age calculator of the focal control engine as described herein.

Exemplary Operating Environment

Figure 6:
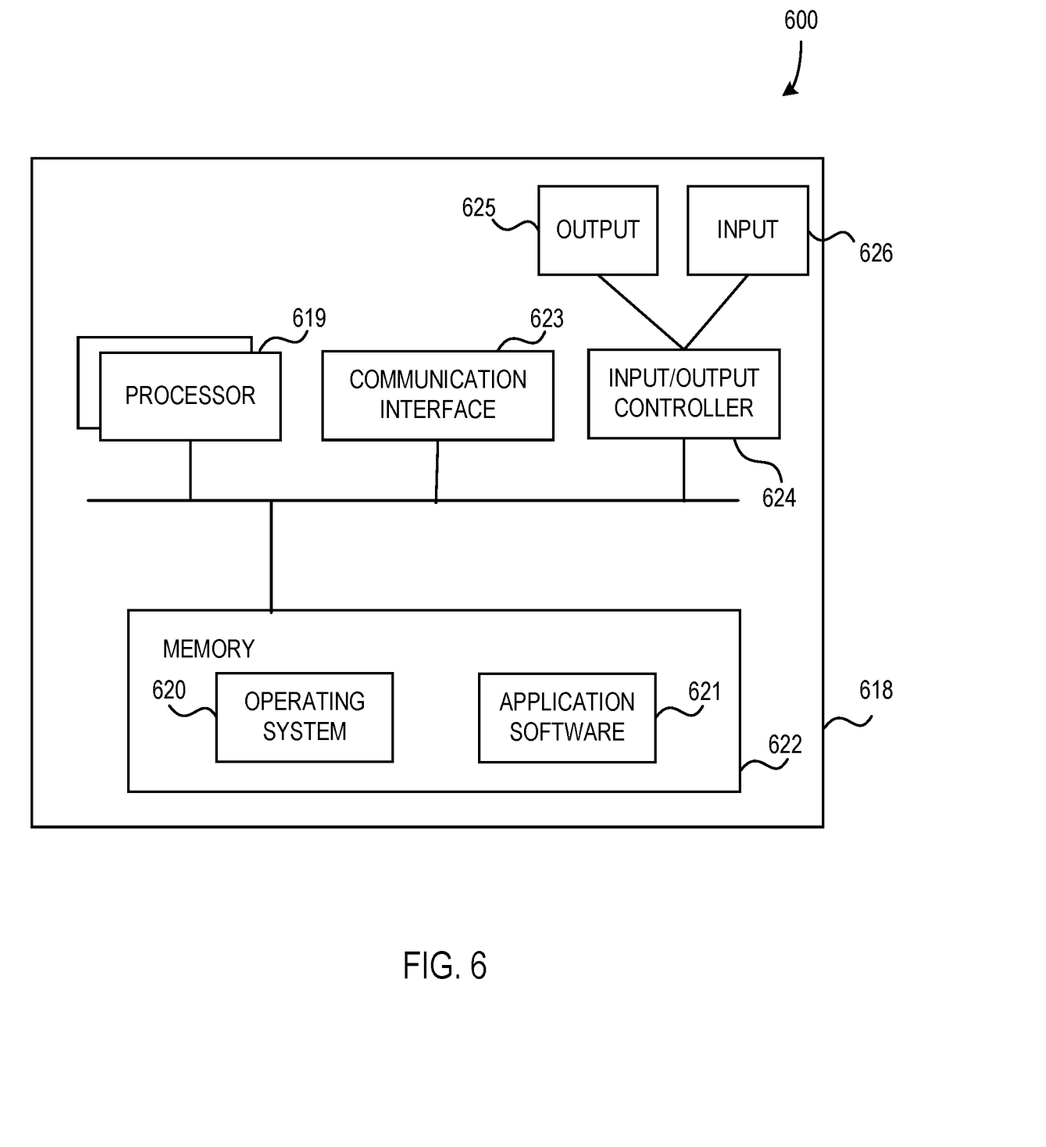
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers or any other suitable type of processors for processing computer executable instructions to control the operation of the electronic device. Alternatively, or in addition, the processor 619 is any technology capable of executing logic or instructions, such as a hard-coded machine. Platform software comprising an operating system 620 or any other suitable platform software may be provided on the apparatus 618 to enable application software 621 to be executed on the device. According to an embodiment, estimating a user's age and controlling focal parameters of a head mounted display device based on the age estimate as described herein may be accomplished by software.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for controlling focal parameters of a visual display based on ocular features, the system comprising:
at least one processor;
a visual display including at least one eye tracking sensor; and
at least one memory of the pen device comprising computer program code, the at least one memory and the computer program code configured to, with the at least one processor, cause the at least one processor to:
collect, via the at least one eye tracking sensor, ocular metric data associated with at least one ocular feature of a user's eye;
calculate a user age estimate based on analysis of the ocular metric data using at least one machine learning algorithm and an associated ocular metric data set;
calculate a confidence value associated with the user age estimate based on the analysis of the ocular metric data; and
control at least one focal parameter of the visual display based on the calculated user age estimate and the associated confidence value.
wherein the analysis of the ocular metric data includes comparing the collected ocular metric data to age range data from the ocular metric data set to determine an age range estimate.
wherein analysis of the ocular metric data further includes:
calculating a plurality of age estimate values, wherein each age estimate value is based on an ocular metric data value of the collected ocular metric data;
applying a defined metric weight associated with each ocular metric data value to the associated age estimate value to form a plurality of weighted age estimate values; and
combining the plurality of weighted age estimate values to generate the user age estimate.
wherein the ocular metric data includes at least one or pupil size data, pupil accommodation data, pupil shape data, blink dynamic data, saccade dynamic data, eye lid characteristic data, and progressive lens data.
wherein controlling the at least one focal parameter includes at least one of fixing a focal plane of display output to greater than or equal to 1 meter, applying optical corrections, and enabling variable and multi-focus capabilities.
wherein controlling the at least one focal parameter includes at least one of prompting a user to confirm a suggested focal parameter modification and automatically applying a focal parameter modification.
the at least one memory and the computer program code configured to, with the at least one processor, further cause the at least one processor to:
collect feedback based on controlling the at least on focal parameter; and
update the machine learning algorithm based on the collected feedback.
wherein the collected feedback includes at least one of data based on user behavior after controlling the at least one focal parameter, data indicating a user manually changing the at least one controlled focal parameter, response data from prompting the user about the clarity of output of the visual display, and response data from prompting the user about the user's current age.
wherein updating the machine learning algorithm includes adjusting metric weights associated with ocular metric values and applied to age estimate values.
A computerized method for controlling focal parameters of a visual display based on ocular features, the method comprising:
collecting, by a processor using at least one eye tracking sensor, ocular metric data associated with at least one ocular feature of a user's eye;
calculating, by the processor, a user age estimate based on analysis of the ocular metric data using at least one machine learning algorithm and an associated ocular metric data set;
calculating, by the processor, a confidence value associated with the user age estimate based on the analysis of the ocular metric data; and
controlling, by the processor, at least one focal parameter of the visual display based on the calculated user age estimate and the associated confidence value.
wherein the analysis of the ocular metric data includes comparing the collected ocular metric data to age range data from the ocular metric data set to determine an age range estimate.
wherein analysis of the ocular metric data further includes:

calculating a plurality of age estimate values, wherein each age estimate value is based on an ocular metric data value of the collected ocular metric data;

applying a defined metric weight associated with each ocular metric data value to the associated age estimate value to form a plurality of weighted age estimate values; and combining the plurality of weighted age estimate values to generate the user age estimate.

wherein the ocular metric data includes at least one or pupil size data, pupil accommodation data, pupil shape data, blink dynamic data, saccade dynamic data, eye lid characteristic data, and progressive lens data.

wherein controlling the at least one focal parameter includes at least one of fixing a focal plane of display output to greater than or equal to 1 meter, applying optical corrections, and enabling variable and multi-focus capabilities.

wherein controlling the at least one focal parameter includes at least one of prompting a user to confirm a suggested focal parameter modification and automatically applying a focal parameter modification.

further comprising:

collecting feedback based on controlling the at least on focal parameter; and updating the machine learning algorithm based on the collected feedback.

One or more computer storage media having computer-executable instructions for controlling focal parameters of a visual display based on ocular features that, upon execution by a processor, cause the processor to at least:

collect, via at least one eye tracking sensor of the visual display, ocular metric data associated with at least one ocular feature of a user's eye;

calculate a user age estimate based on analysis of the ocular metric data using at least one machine learning algorithm and an associated ocular metric data set;

calculate a confidence value associated with the user age estimate based on the analysis of the ocular metric data; and control at least one focal parameter of the visual display based on the calculated user age estimate and the associated confidence value.

wherein the analysis of the ocular metric data includes comparing the collected ocular metric data to age range data from the ocular metric data set to determine an age range estimate.

wherein analysis of the ocular metric data further includes:

calculating a plurality of age estimate values, wherein each age estimate value is based on an ocular metric data value of the collected ocular metric data;

applying a defined metric weight associated with each ocular metric data value to the associated age estimate value to form a plurality of weighted age estimate values; and combining the plurality of weighted age estimate values to generate the user age estimate.

wherein the ocular metric data includes at least one or pupil size data, pupil accommodation data, pupil shape data, blink dynamic data, saccade dynamic data, eye lid characteristic data, and progressive lens data.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for collecting, by at least one eye tracking sensor, ocular metric data associated with at least one ocular feature of a user's eye; means for calculating a user age estimate based on analysis of the ocular metric data using at least one machine learning algorithm and an associated ocular metric data set; means for calculating a confidence value associated with the user age estimate based on the analysis of the ocular metric data; and means for controlling at least one focal parameter of the visual display based on the calculated user age estimate and the associated confidence value. The illustrated one or more processors 619 together with the computer program code stored in memory 622 constitute exemplary processing means for obtaining and processing sensor data, comparing data to ocular metric data patterns, calculating confidence values and comparing the values to a confidence threshold, and controlling the focal parameters of the head mounted display as described herein.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for controlling focal parameters of a visual display based on ocular features, the system comprising:
   at least one processor;
   a visual display including at least one eye tracking sensor; and
   at least one memory communicatively coupled to the at least one processor and comprising computer program code, the at least one memory and the computer program code configured to, with the at least one processor, cause the at least one processor to:
   collect, via the at least one eye tracking sensor, ocular metric data associated with at least one ocular feature of a user's eye;
   calculate a user age estimate based on analysis of the ocular metric data using at least one machine learning algorithm and an associated ocular metric data set;
   calculate a confidence value associated with the user age estimate based on the analysis of the ocular metric data; and
   control at least one focal parameter of the visual display based on the calculated user age estimate and the associated confidence value.

2. The system of claim 1, wherein the analysis of the ocular metric data includes comparing the collected ocular metric data to age range data from the ocular metric data set to determine an age range estimate.

3. The system of claim 2, wherein analysis of the ocular metric data further includes:
   calculating a plurality of age estimate values, wherein each age estimate value is based on an ocular metric data value of the collected ocular metric data;
   applying a defined metric weight associated with each ocular metric data value to the associated age estimate value to form a plurality of weighted age estimate values; and
   combining the plurality of weighted age estimate values to generate the user age estimate.

4. The system of claim 1, wherein the ocular metric data includes at least one or pupil size data, pupil accommodation data, pupil shape data, blink dynamic data, saccade dynamic data, eye lid characteristic data, and progressive lens data.

5. The system of claim 1, wherein controlling the at least one focal parameter includes at least one of fixing a focal plane of display output to greater than or equal to 1 meter, applying optical corrections, and enabling variable and multi-focus capabilities.

6. The system of claim 1, wherein controlling the at least one focal parameter includes at least one of prompting a user to confirm a suggested focal parameter modification and automatically applying a focal parameter modification.

7. The system of claim 1, the at least one memory and the computer program code configured to, with the at least one processor, further cause the at least one processor to:
   collect feedback based on controlling the at least on focal parameter; and
   update the machine learning algorithm based on the collected feedback.

8. The system of claim 7, wherein the collected feedback includes at least one of data based on user behavior after controlling the at least one focal parameter, data indicating a user manually changing the at least one controlled focal parameter, response data from prompting the user about the clarity of output of the visual display, and response data from prompting the user about the user's current age.

9. The system of claim 7, wherein updating the machine learning algorithm includes adjusting metric weights associated with ocular metric values and applied to age estimate values.

10. A computerized method for controlling focal parameters of a visual display based on ocular features, the method comprising:
    collecting, by a processor using at least one eye tracking sensor, ocular metric data associated with at least one ocular feature of a user's eye;
    calculating, by the processor, a user age estimate based on analysis of the ocular metric data using at least one machine learning algorithm and an associated ocular metric data set;
    calculating, by the processor, a confidence value associated with the user age estimate based on the analysis of the ocular metric data; and
    controlling, by the processor, at least one focal parameter of the visual display based on the calculated user age estimate and the associated confidence value.

11. The computerized method of claim 10, wherein the analysis of the ocular metric data includes comparing the collected ocular metric data to age range data from the ocular metric data set to determine an age range estimate.

12. The computerized method of claim 11, wherein analysis of the ocular metric data further includes:
    calculating a plurality of age estimate values, wherein each age estimate value is based on an ocular metric data value of the collected ocular metric data;
    applying a defined metric weight associated with each ocular metric data value to the associated age estimate value to form a plurality of weighted age estimate values; and
    combining the plurality of weighted age estimate values to generate the user age estimate.

13. The computerized method of claim 10, wherein the ocular metric data includes at least one or pupil size data, pupil accommodation data, pupil shape data, blink dynamic data, saccade dynamic data, eye lid characteristic data, and progressive lens data.

14. The computerized method of claim 10, wherein controlling the at least one focal parameter includes at least one of fixing a focal plane of display output to greater than or equal to 1 meter, applying optical corrections, and enabling variable and multi-focus capabilities.

15. The computerized method of claim 10, wherein controlling the at least one focal parameter includes at least one of prompting a user to confirm a suggested focal parameter modification and automatically applying a focal parameter modification.

16. The computerized method of claim 10, further comprising:
    collecting feedback based on controlling the at least on focal parameter; and
    updating the machine learning algorithm based on the collected feedback.

17. One or more computer storage media having computer-executable instructions for controlling focal parameters of a visual display based on ocular features that, upon execution by a processor, cause the processor to at least:

collect, via at least one eye tracking sensor of the visual display, ocular metric data associated with at least one ocular feature of a user's eye;

calculate a user age estimate based on analysis of the ocular metric data using at least one machine learning algorithm and an associated ocular metric data set;

calculate a confidence value associated with the user age estimate based on the analysis of the ocular metric data; and     control at least one focal parameter of the visual display based on the calculated user age estimate and the associated confidence value.

18. The one or more computer storage media of claim 17, wherein the analysis of the ocular metric data includes comparing the collected ocular metric data to age range data from the ocular metric data set to determine an age range estimate.

19. The one or more computer storage media of claim 18, wherein analysis of the ocular metric data further includes:

calculating a plurality of age estimate values, wherein each age estimate value is based on an ocular metric data value of the collected ocular metric data;

applying a defined metric weight associated with each ocular metric data value to the associated age estimate value to form a plurality of weighted age estimate values; and     combining the plurality of weighted age estimate values to generate the user age estimate.

20. The one or more computer storage media of claim 17, wherein the ocular metric data includes at least one or pupil size data, pupil accommodation data, pupil shape data, blink dynamic data, saccade dynamic data, eye lid characteristic data, and progressive lens data.

\* \* \* \* \*